(No Model.)
A. F. PRAHM.
CULINARY UTENSIL.
No. 435,448.  Patented Sept. 2, 1890.
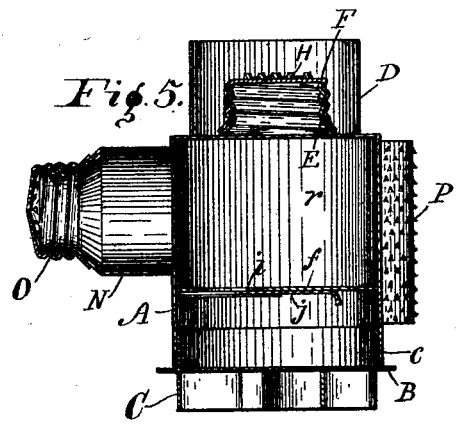
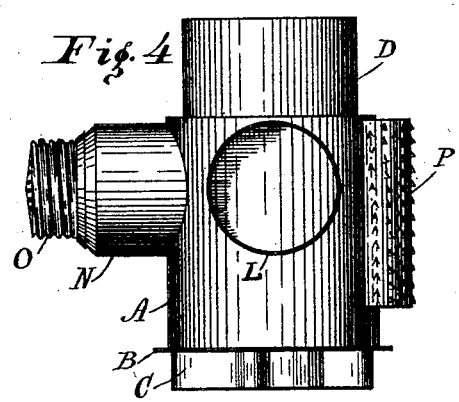
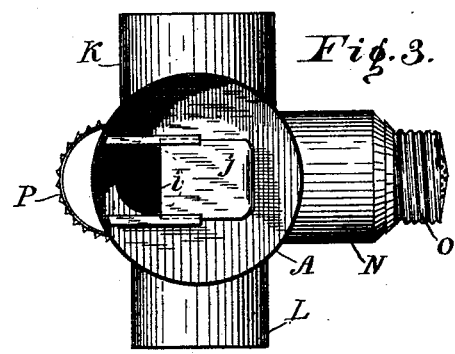
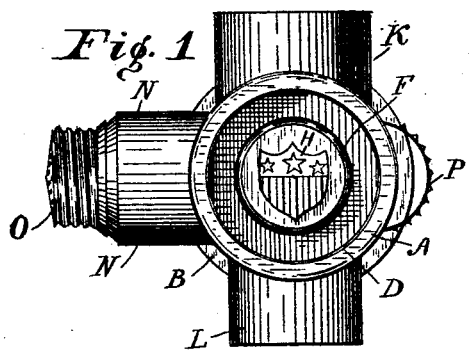
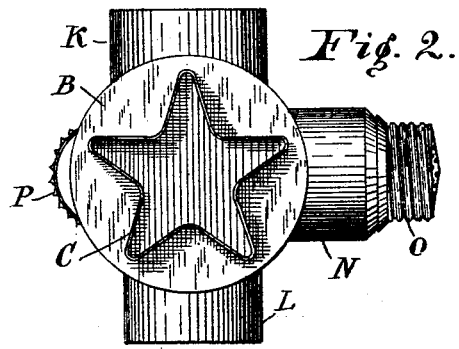
Witnesses:
V. M. Hood.
F. L. McGahan.
Inventor:
Adolph F. Prahm.
By His Attorney
H. P. Hood.

UNITED STATES PATENT OFFICE.

ADOLPH F. PRAHM, OF INDIANAPOLIS, INDIANA.

CULINARY UTENSIL.

SPECIFICATION forming part of Letters Patent No. 435,448, dated September 2, 1890.

Application filed April 26, 1890. Serial No. 349,638. (No model.)

*To all whom it may concern:*

Be it known that I, ADOLPH F. PRAHM, a citizen of the United States, residing at Indianapolis, in the county of Marion and State of Indiana, have invented a new and useful Improvement in Culinary Utensils, of which the following is a specification.

My invention relates to an improved culinary utensil to be used in cutting and ornamenting cakes.

The object of my improvement is to combine in a single utensil a series of cake-cutters of different size or design, a holder for a series of detachable cutters, means for impressing designs in the surface of a cake, a receptacle adapted for holding powdered sugar and for sprinkling the same upon a cake, and another receptacle for nutmegs or other condiments.

The accompanying drawings illustrate my invention.

Figure 1 represents a plan; Fig. 2, a plan of the side opposite that shown in Fig. 1; Fig. 3, a plan of the same side, having the detachable cutter removed; Fig. 4, a side elevation, and Fig. 5 a vertical central section.

The body of the utensil consists of a sheet-metal cylinder A, having one end permanently closed and the other end open and adapted to receive a removable cover B, having on one side an annular flange c, which fits nicely into the open end of A, and having on its outside a raised cutter C, formed of sheet metal and bent to form a star or other ornamental design. The purpose is to furnish several covers B, having flanges of the same size and differently-formed cutters, so that one may be substituted for another, as occasion requires. The interior of cylinder A is divided by a transverse partition $f$, in which is an opening $i$, having a sliding cover $j$, thus forming a closed interior chamber $r$.

On the closed end of cylinder A a smaller cylinder, forming a circular cutter D, is secured, and also a central screw-threaded boss E, on which is screwed a sheet-metal cap F, bearing a raised design H, and forming a die of less height than the cutter, the arrangement being such that a circular disk having the design H imprinted on its upper surface may be cut from a sheet of dough, and the cap or die F may be easily detached and another substituted. Mounted on opposite sides of the body at right angles to cutter D are a pair of similar circular cutters K and L, of different diameters.

Mounted on the side of the body at right angles to cutters K and L is a cylindrical chamber N, adapted to hold powdered sugar or salt, and having its outer end screw-threaded and closed by a perforated screw-cap O. Cap O and cap F are interchangeable, so that the chamber N may be completely closed, when desirable, by cap F, cap O being in that case screwed onto the boss E. To the remaining side of cylinder A a nutmeg-grater P is secured.

In operation nutmegs or other cooking materials are stored in the interior chamber $r$, and powdered sugar is stored in chamber N. If large circular cakes are required, the cover B is removed and the cakes are cut out with the open end of cylinder A, cutter D being used as a handle. If smaller circular cakes are required, they are cut out with cutters D, K, or L, those cut with cutter D being ornamented with the design H. If an ornamental outline, as a star, is required, the cover B, having the cutter C, is placed in the open end of the cylinder A. The cakes when cut may be sprinkled with sugar from chamber N.

I claim as my invention—

1. In a culinary utensil, the combination of a cylindrical sheet-metal body open at one end and closed at the other, said open end forming a cake-cutter, an open cylindrical cutter of less diameter mounted on the closed end of the body, a raised boss mounted centrally within said cutter, and a cap bearing a raised design detachably mounted on said boss, all substantially as set forth.

2. In a culinary utensil, the combination of the cylindrical body closed at one end and open at the other, the open cylinder, of less diameter than the body, mounted on the closed end of the body and adapted to form a handle therefor and also a cake-cutter, and the cover removably secured in the open end of the body and bearing on its outer surface a cake-cutter, all substantially as set forth.

3. The above-described combination culinary utensil, consisting of the cylindrical body adapted at one end to cut cakes and having an interior closed compartment, a series of cylindrical cake-cutters of different diameters secured to the outer surfaces of said body, and a chamber also secured to one of the outer surfaces of the body and having a removable perforated cap, all combined and arranged substantially as and for the purpose set forth.

ADOLPH F. PRAHM.

Witnesses:
H. P. HOOD,
V. M. HOOD.